(12) United States Patent
Lyon

(10) Patent No.: US 7,482,971 B2
(45) Date of Patent: Jan. 27, 2009

(54) TIME-OF-FLIGHT-RANGING SYSTEM AND METHOD FOR CALIBRATING SUCH A SYSTEM

(75) Inventor: George Quinton Lyon, Peterborough (CA)

(73) Assignee: Siemens Milltronics Process Instruments, Inc., Peterborough, ON (CA)

( * ) Notice: Subject to any disclaimer, the term of this patent is extended or adjusted under 35 U.S.C. 154(b) by 0 days.

(21) Appl. No.: 11/529,454

(22) Filed: Sep. 28, 2006

(65) Prior Publication Data

US 2008/0036649 A1 Feb. 14, 2008

(30) Foreign Application Priority Data

Sep. 28, 2005 (EP) ................................. 05021177

(51) Int. Cl.
*G01S 7/40* (2006.01)
*G01S 13/10* (2006.01)
*G01S 13/88* (2006.01)

(52) U.S. Cl. ............... 342/174; 342/124; 342/134; 342/175; 342/200

(58) Field of Classification Search ............... 342/124, 342/174, 175, 202, 134
See application file for complete search history.

(56) References Cited

U.S. PATENT DOCUMENTS

| 2,788,520 | A | | 4/1957 | Arenberg et al. |
| 3,083,361 | A | * | 3/1963 | Schwab ................ 342/165 |
| 4,245,221 | A | | 1/1981 | Kipp et al. |
| 4,903,029 | A | | 2/1990 | Newberg et al. |
| 5,406,842 | A | | 4/1995 | Locke |
| 6,864,833 | B2 | * | 3/2005 | Lyon ................... 342/124 |
| 6,992,501 | B2 | * | 1/2006 | Rapport ................ 326/30 |
| 2002/0186163 | A1 | * | 12/2002 | Morchel et al. ........ 342/174 |

* cited by examiner

*Primary Examiner*—Thomas H Tarcza
*Assistant Examiner*—Cassi Galt

(57) ABSTRACT

An embedded calibration mechanism and method for a time-of-flight ranging system. The calibration mechanism (200) comprises a channel (202) having known characteristics. Periodically or as part of a calibration function, a pulse is transmitted through the calibration channel (202) and parameters such transmit pulse delay time and apparent velocity are determined. The calibration parameters or measurements are used to calibrate or compensate operation or measurements from the measurement channel.

23 Claims, 5 Drawing Sheets

TIME-OF-FLIGHT-RANGING SYSTEM AND METHOD FOR CALIBRATING SUCH A SYSTEM

CROSS REFERENCE TO RELATED APPLICATIONS

This application claims priority of European application No. 05021177.0 EP filed Sep. 28, 2005, which is incorporated by reference herein in its entirety.

FIELD OF THE INVENTION

The present invention relates to a time-of-flight ranging system and a method for calibrating such a system.

BACKGROUND OF THE INVENTION

Pulse-echo acoustic ranging systems, also known as time-of-flight ranging systems, are commonly used in level measurement applications. Pulse-echo acoustic ranging systems determine the distance to a reflector (i.e. reflective surface) by measuring how long after transmission of a burst of energy pulses the echo or reflected pulses are received. Such systems typically use ultrasonic pulses or pulse radar or guided radar signals.

Pulse-echo acoustic ranging systems generally include a transducer and a signal processor. The transducer serves the dual role of transmitting and receiving the energy pulses. The signal processor is for detecting and calculating the distance or range of the object based on the transmit times of the transmitted and reflected energy pulses.

When measuring distance using the time of flight method in radar or TDR (time domain reflectometry) based instruments, it is difficult to maintain a high degree of accuracy over a range of temperatures and operating conditions. There will be variations in the electronic components that lead to errors in the measured distance.

In the art, the method of sampling multiple pulses to create a lower speed representation is known. It typically involves using two pulse trains at slightly different frequencies with the higher frequency clock used to generate transmit measurement pulses and the lower frequency clock is used to generate sampling pulses. The control of these pulses is performed by a timebase generator and it is critical to create a precisely known start instant and apparent velocity in order to precisely determine the distances. Systems have been designed which control the frequencies very well, but fall short of accommodating variations in the high frequency pulsing sections which are driven by the timebase generator.

A radar or TDR system can be built and calibrated according to the art to be accurate to a few millimeters which is equivalent to about 7 picoseconds per millimeter. However, as a result of aging or temperature variation in the components, there may be slight differences in the operation of the radio frequency (RF) oscillators or in the pulses (i.e. control signals) that enable the RC oscillators. In addition, the timebase generator may itself introduce a few picoseconds of error that can add or subtract from the total accumulating error. While these variations can be minimized by further design enhancements, the design becomes more and more expensive as higher and better accuracy and stability is sought, until the point is reached where it is prohibitively expensive to improve the accuracy any further.

Accordingly, there remains a need for new methods and apparatus to improve the accuracy of such systems.

BRIEF SUMMARY OF THE INVENTION

The present invention provides a time-of-flight ranging system and a method for calibrating such a system as defined in the independent claims.

Preferred embodiments of the system and the method according to the invention are specified in the remaining claims.

According to one aspect, the present invention comprises a calibration channel having known characteristics. Periodically a pulse is transmitted and measured through the calibration channel. According to this aspect, the calibration channel is used to compensate for variations that arise from a change in the shape of the transmitter pulse or burst over temperature.

According to another aspect, the known characteristics of the calibration channel allow calculation of both the offset distance (i.e. the exact start time) and the apparent velocity.

In a first aspect, the present invention provides a time-of-flight ranging system comprising: an antenna for emitting an energy pulse and coupling a reflected energy pulse; a switch, the switch has a first terminal, a second terminal, a third terminal, and a control terminal, the control terminal is adapted to receive a control signal for switching the first terminal between the second terminal and the third terminal, and the second terminal is coupled to the antenna for selecting the antenna in response to the control signal; a controller, the controller has an output coupled to the control terminal of the switch, and a component for generating the control signal for controlling the switch; a transceiver operatively coupled to the controller, the transceiver has a bidirectional port, the bidirectional port is coupled to the first terminal of the switch, the transceiver has an input port for receiving a pulse train and generating a transmit pulse for exciting the antenna for emitting the energy pulse, and the transceiver has an output port for outputting a reflected energy pulse received from the antenna; and a calibration module, the calibration module has a calibration bidirectional port coupled to the third terminal of the switch, the calibration bidirectional port is selectively coupled to the bidirectional port of the transceiver through the switch in response to the control signal, and when selectively coupled the calibration module receives a calibration transmit pulse from the transceiver, and the calibration module includes a calibration component for generating an echo pulse in response to the calibration transmit pulse.

In another aspect, the present invention provides a method for calibrating a time-of-flight ranging system, the time-of-flight ranging system includes an antenna for emitting an energy pulse and detecting a reflected energy pulse, a transceiver having a bidirectional port operatively coupled to the antenna through a switching device, a calibration channel having a bidirectional port operatively coupled to the bidirectional port of the transceiver, a controller having a control output for controlling the switching device to selectively couple the transceiver to the antenna or to the calibration channel, the method comprises the steps of: actuating the switching device to couple the bidirectional port of the transceiver to the calibration channel; generating a calibration transmit pulse and transmitting said calibration transmit pulse to the calibration channel; receiving a calibration echo pulse from the calibration channel, the calibration echo pulse is associated with the calibration transmit pulse; determining one or more calibration parameters based on the calibration transmit pulse or the calibration echo pulse.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Reference will now be made to the accompanying drawings, which show, by way of example, an embodiment of the present invention, and in which.

In the drawings, like references indicate like elements.

DETAILED DESCRIPTION OF THE PREFERRED EMBODIMENT

Figure 1:
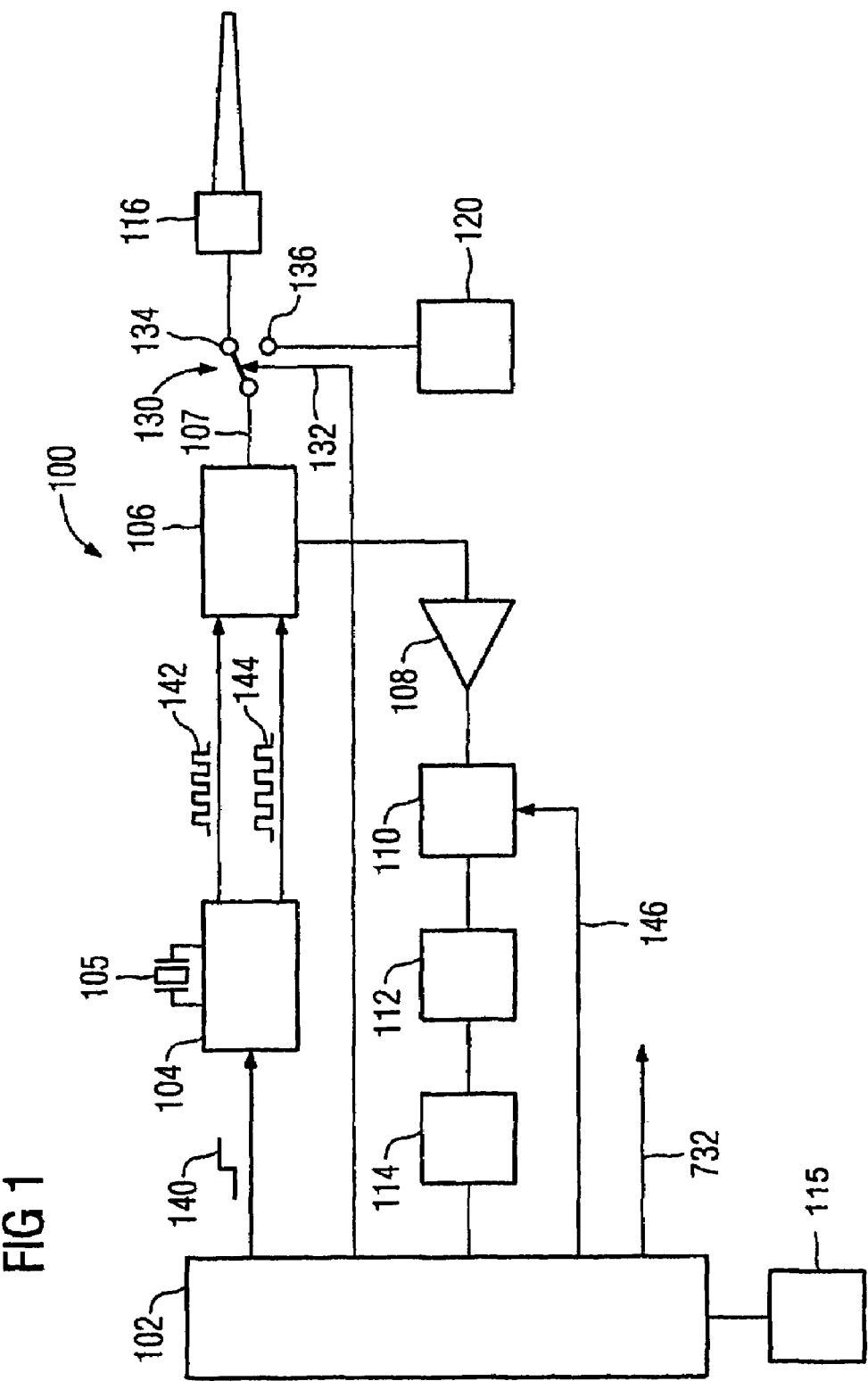
FIG. 1 is a schematic diagram of a time-of-flight ranging pulse level measurement system having an embedded calibration mechanism according to the present invention.

Reference is first made to FIG. 1 which shows a time-of-flight level measurement device 100. As described, the level measurement device 100 comprises a radar based or a guided wave radar time domain reflectometry (TDR) system. In accordance with one aspect of the present invention, the level measurement device 100 includes an embedded calibration mechanism or module indicated generally by reference 120. As described in more detail below, the embedded calibration module 120 provides the capability to generate internal signals and perform calibration operations to measure errors which may arise in the electronic circuitry due to the effects of temperature drift and/or component drift over time.

As shown in FIG. 1, the level measurement device 100 comprises a microcontroller or microprocessor 102, a time-base generator 104, a radar transceiver 106, an amplifier 108, a filter module 110, an envelope detector module 112, an analog-to-digital converter 114, a radiating antenna 116 and the embedded calibration module 120. The time-base generator 104 generates accurate pulse or pulse train output signals for the radar transceiver 106.

As shown, the radar transceiver 106 has a bidirectional input/output port 107 which is coupled to the radiating antenna 116 and to the calibration module 120 through a selectable switch 130. The switch 130 is coupled to an output port on the microcontroller 102 and actuated by a control signal applied to a control input 132. In one position 134, the output of the radar transceiver 106 is coupled to the radiating antenna 116. In transmit mode the radar transceiver 106 excites or energizes the antenna 116 to emit a pulse or burst of pulses. In receive mode, the radar transceiver 106 couples a pulse or burst of pulses and converts them into electrical signal(s) for output to the amplifier 108. In calibration mode, the calibration switch 130 is set to position 136 and the bidirectional port 107 of the radar transceiver 106 is coupled by the switch 130 to the calibration module 120. As will be described in more detail below, the calibration module 120 provides a mechanism for providing a calibration reference with known characteristics. The calibration reference makes it possible to determine variations in the transmit pulse or burst as a result of temperature effects and to determine changes and offsets due to component drift over time.

Figure 3A:
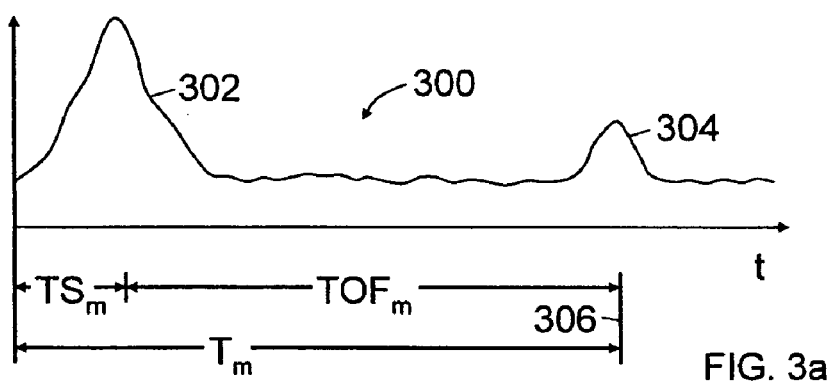
FIG. 3a shows in diagrammatic form an echo profile for a measurement transmit pulse or burst for the time-of-flight level measurement system of FIG. 1.

The microcontroller 102 applies a start or enable signal 140 to the time-base generator 104. The time-base generator 104 as shown generates and outputs two pulse trains 142 and 144 to the radar transceiver 106. The time-base generator 104 is driven by a quartz component 105 to provide precisely generated pulses for the two pulse trains 142 and 144. In known manner, one of the pulse trains (e.g. 142) comprises a higher frequency clock which is used in the radar transceiver 106 to generate the measurement transmit pulses or burst. The other pulse train (e.g. 144) comprises a lower frequency clock which is used to sample the reflected or echo pulse(s). In transmit mode, the radiating antenna 116 emits a transmit pulse or burst of pulses from the radar transceiver 106. The transmit pulse is reflected by the liquid or material surface to produce a reflected pulse or echo. As indicated in FIG. 3a, which depicts an echo profile 300, the transmit pulse 302 and the reflected or echo pulse 304 are separated by a time interval 306 corresponding to the time of flight or $TOF_m$ for a measurement cycle. The output from the antenna 116 is coupled by the radar transceiver 106 and processed, i.e. converted into an electrical signal which is fed to a receiver stage comprising the amplifier 108, the filter 110 and the envelope detector 112 to generate the reflected pulse 304. The filter 110 may comprise an adjustable or tunable filter circuit and for such an implementation the microcontroller 102 includes a control output 146 for controlling, i.e. tuning, the adjustable filter 110. The output signal from the transceiver 106 is fed to the amplifier 108 and the amplified output may be filtered by the filter 110 before being shaped by the envelope detector 112. The output from the envelope detector 112 is then sampled and digitized by the analog-to-digital converter 114.

The time-of-flight ranging level measurement device 100, i.e. a radar-based ranging device, is installed in a tank (not shown) containing the liquid, or other material. The top surface of the liquid provides a reflective surface or reflector which reflects the radar pulse generated from the radiating antenna 116. In normal operation, a transmitter pulse, for example having the form of a transmit pulse 302 depicted in the echo profile 300 of FIG. 3a is emitted by the radiating antenna 116 and the radar transceiver 106. The reflected radar pulse, for example having the form of the reflected or echo pulse 304 in FIG. 3a, is generated from the output of the antenna 116 which is converted by the radar transceiver 106 into a corresponding electrical signal (e.g. by a sampling operation utilizing the pulse train 144), and applied to the amplifier 108 in the receiver stage. The detected electrical signal output from the envelope detector 112 is sampled and digitized by the A/D converter 114 (FIG. 1). The microcontroller 102 takes the digitized output and generates the receive echo waveform or profile 300 having a form as shown in FIG.

3a. The receive echo profile 300 is characterized by the echo pulse 304, i.e. the reflected radar pulse, and the measurement transmit pulse 302. The microcontroller unit 102 executes an algorithm which identifies and verifies the echo pulse 304 and calculates the range, i.e. the distance to the reflective surface, from the time it takes for the reflected radar pulse, i.e. $TOF_m$, to travel from the reflective surface to the radar transceiver 106. From this calculation, the distance to the surface of the liquid and thereby the level of the liquid is determined. The microcontroller 102 also controls the transmission of data and control signals through a communication interface 115 for example, a current loop interface. The microcontroller 102 is suitably programmed to perform these operations as will be within the understanding of those skilled in the art. In addition to these functions, the microcontroller 102 includes firmware to execute the functions associated with the embedded calibration module 120 as described in more detail below.

Figure 2:
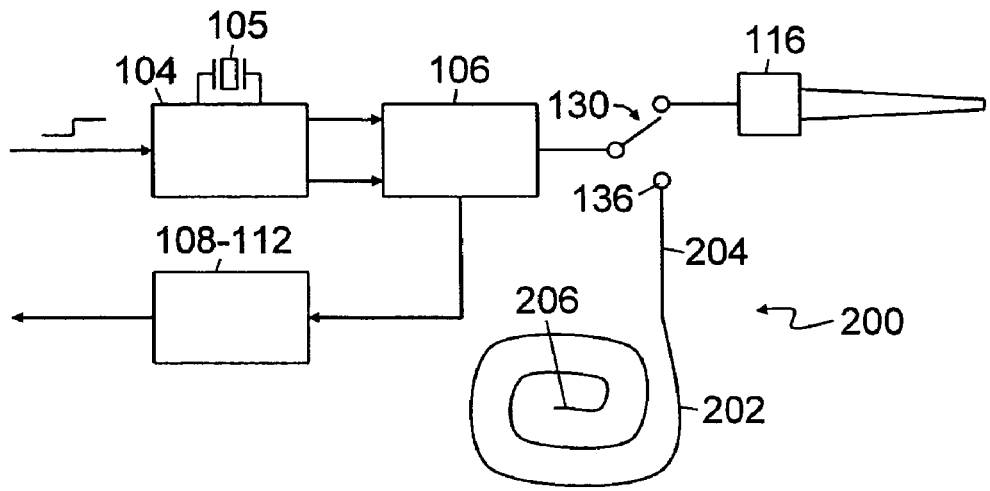
FIG. 2 shows in schematic form an embodiment of the embedded calibration mechanism according to the present invention.

Reference is next made to FIG. 2, which shows an embedded calibration mechanism according to one embodiment of the present invention and indicated generally by reference 200. The embedded calibration mechanism 200 according to this embodiment comprises a calibration cable or reference line indicated generally by reference 202. The calibration cable or line 202 provides a calibration channel as will be described in more detail below. The calibration cable 202 has one end 204 coupled to the terminal 136 of the calibration switch 130. The calibration cable 202 is terminated with a large impedance mismatch so that a good reflection is returned to the receiver (i.e. the radar transceiver 106—FIG. 1). If the termination is an open circuit, then the reflection polarity remains the same. If the termination is a short circuit, then the reflection polarity is reversed. As shown in FIG. 2, the other end 206 of the cable 202 is terminated in an open circuit as shown. In another implementation, the other end 206 of the cable 202 is terminated in a short circuit.

For the embodiment of FIG. 2, the calibration cable 202 comprises a length of coaxial cable. For the coaxial cable, the velocity of electromagnetic waves in the cable will depend on the dielectric material/composition. As such, the velocity can be determined from the dielectric material parameters and used as a calibration parameter for the functions stored in firmware and executed by the microcontroller 102 (FIG. 1) as will be described in more detail below.

In addition to a coaxial cable, the calibration or reference line may be implemented using any one of the following components or techniques: (1) a section of waveguide; (2) magnetostatic slow waves; (3) a thin film delay line; (4) a microwave acoustic delay line; (5) a lumped distributed delay line; or (6) a meander line. The calibration or reference line is terminated with a large impedance mismatch so that a good reflection is returned to the receiver (i.e. the radar transceiver 106-FIG. 1), If the termination is an open circuit then the reflection polarity remains the same. If the termination is a short circuit, then the reflection polarity is reversed. For systems where the reflected pulse(s) is rectified and peak detected, the polarity of the reflection is not typically a design issue, however, for systems where the polarity is maintained, such as TDR based devices, any changes in polarity are tracked and taken into account as required in the firmware or control program.

For an implementation utilizing a section of waveguide, the calibration or reference line 202 may comprise a circular or rectangular tube that is filled with air, or filled with a known dielectric material in order to reduce the propagation velocity. Such a waveguide may also be tapped and loaded periodically to further slow the propagation of electromagnetic waves.

MSW are slow electromagnetic waves that propagate at microwave frequencies in magnetically biased ferrites. For an implementation utilizing magnetostatic slow waves (MSW), a magnetically biased material, for example YIG (yttrium iron garnet) is used to slow the propagation of the electromagnetic waves (e.g. microwave signals) through the reference line. A magnetostatic slow wave delay line is suitable for devices that require microwave signals to be delayed by nanoseconds. A MSW based delay calibration line provides delay and insertion losses that are comparable to a coaxial cable but the MSW delay line occupies a much smaller volume.

For an implementation utilizing a thin film, the calibration or reference line comprises a very thin film fabricated on a suitable substrate or carrier. Using thin film fabrication techniques (for example U.S. Pat. No. 5,365,203), a long delay line having an impedance of 50 or 75 Ohms can made in a small package. For the substrate, a ceramic dielectric is used to provide stability and a high dielectric constant.

For a microwave acoustic delay line implementation, either surface or bulk acoustic waves at microwave frequencies are launched into a calibration or reference line comprising a material such as sapphire. Because these types of waves are much slower than electromagnetic waves, the required delay in wave propagation (and velocity determination) can be achieved using small volume calibration lines.

For a lumped distributed delay line implementation, the calibration or reference line comprises a series of inductors and conductors connected or coupled in a ladder network configuration.

For a meander line implementation, the calibration or reference line comprises a track fabricated on a microwave circuit board. The track is formed as a long path which is folded over several times to reduce the space needed to achieve the required delay between the start and the end of the track.

As will be described in more detail below, taking measurements through the calibration cable 202 (FIG. 2) allows calculation of both an offset or start delay time for the transmit pulse and an apparent velocity. The offset or start delay time is represented by TS in FIGS. 3a and 3b and represents the time or delay for the circuit to generate the measurement transmit pulse 302 (and the calibration transmit pulse 322) in response to the start signal 140 (FIG. 1).

Figure 3B:
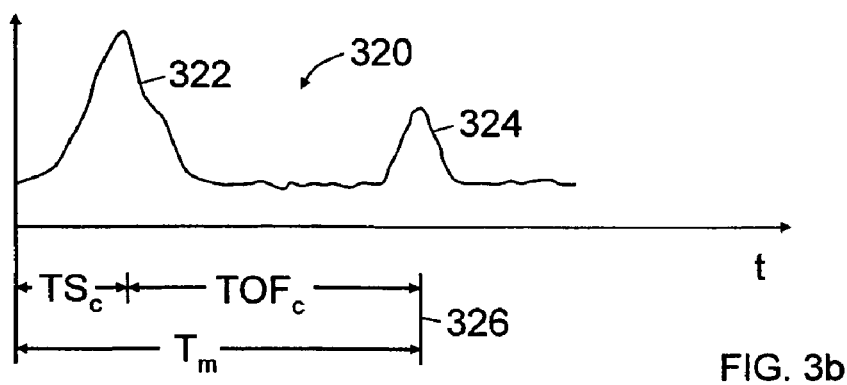
FIG. 3b shows in diagrammatic form an echo profile for a calibration transmit pulse or burst for the time-of-flight level measurement system with the embedded calibration mechanism of FIG. 2.

According to this aspect, a transmit pulse (for example of the form 302 shown in FIG. 3a) is periodically transmitted through the calibration cable 200 to assess the accuracy of the level measurement device 100. FIG. 3a shows in diagrammatic form an exemplary echo profile 300 for a measurement cycle or operation. FIG. 3b shows in diagrammatic form an exemplary echo profile 320 for a calibration cycle or operation. As shown in FIG. 3a, the time of flight between the transmission of the measurement transmit pulse 302 and reception of the reflected or echo measurement pulse 304 is represented by $TOF_m$ and also indicated by reference 306. The transmit pulse 302 is emitted after a start time $TS_m$ which represents the time or delay for circuit to generate the transmit pulse 302 from the start signal 140 (FIG. 1). Similarly, for the calibration echo profile 320, the time of flight between the transmission of the calibration transmit pulse 322 and reception of the reflected or echo calibration pulse 324 is represented by $TOF_c$ and also indicated by reference 326. The calibration transmit pulse 322 is emitted after a start time $TS_c$ which represents the circuit delay in generating the calibration transmit pulse 322 from the start signal 140 (FIG. 1).

Referring back to FIG. 2, the calibration mechanism 200 is used to determine the start time TS if the transit time in the cable 202 $TOF_c$ is known. Similarly, the transit time $TOF_c$ can be determined if the start time TS is known. Then using these two parameters TS and $TOF_c$ and the length of the calibration cable 202 (which is a known or determinable parameter), the distance to the unknown reflector may be calculated from the time-of-flight measurement or $TOF_m$. Other parameters for the calculations include: (1) the equivalent length of the delay line (i.e. the calibration line 202) in air represented by $L_c$; and (2) the apparent velocity of the downconverted replica of the transmit pulse, represented by $V_a$. The equivalent length of the line $L_c$ needs to be known because the velocity of the transmitted signal may be less in the delay line than in free air. For example, a one meter length of coaxial cable may have an equivalent length of 1.3 meters in air.

To determine the measurement distance, i.e. the distance to the surface of the material contained in the vessel, the start delay time TS and the apparent velocity $V_{ac}$ of the transmit pulse need to be known in addition to the time of flight TOF. In the embodiment as depicted in FIGS. 3a and 3b where one transmit pulse and one return or echo pulse are considered, the following equation is used to determine the apparent velocity $V_{ac}$ when the start time TS is known:

$$V_{ac} = 2*L_c/(TOF_c)$$

If the apparent velocity is known, then the start delay TS is calculated according to the following equation:

$$TS_c = T_t - 2*L_c/V_{ac},$$

wherein $T_t$ represents the total time-of-flight. The calculations according to these equations may be implemented as functions or routines in the firmware or stored program executed by the microcontroller 102 (FIG. 1). The variable, i.e. $V_{ac}$ or $TS_c$, can be calculated at regular intervals or as needed by a function or routine in the firmware executed by the microcontroller 102 (FIG. 1).

In a pulse radar system, the velocity $V_a$ is more easily controlled than the start delay time TS because the frequencies can be generated from high accuracy components, such as the quartz crystal 105 for the time-base generator 104 (FIG. 1). Whereas, the start delay time TS is a result of transient responses of the components due temperature and aging which are not as readily controllable.

Having determined the start time TS and the velocity $V_a$, the measured time or $TOF_m$ is used to determine the distance to the target or $D_m$ according to the following equations:

$$TOF_m = T_m - TS, \text{ and}$$

$$D_m = TOF_m/(2*V_a)$$

Figure 4:
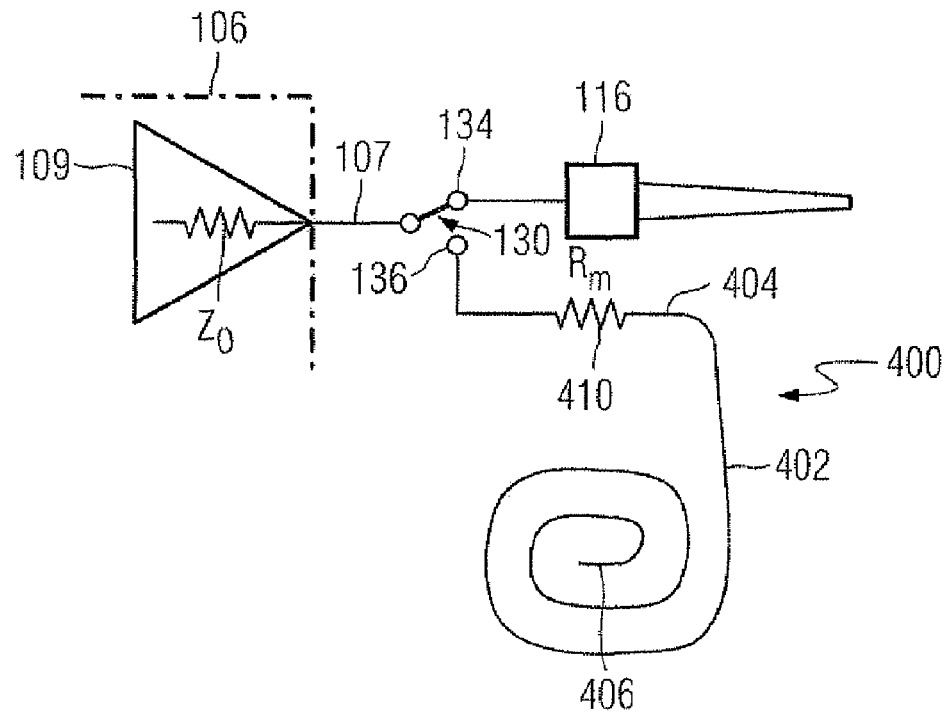
FIG. 4 shows in schematic form another embodiment of an embedded calibration mechanism incorporating a reference delay transmission line according to another aspect of the present invention.
Figure 5:
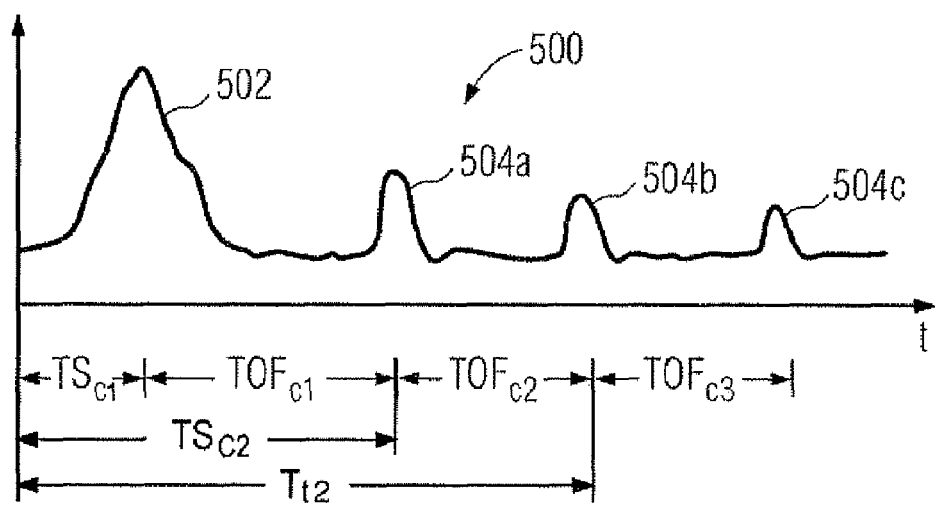
FIG. 5 shows in diagrammatic form a receive echo profile for the transmit pulse and receive echo pulses generated by the embedded calibration mechanism in FIG. 4.

Reference is next made to FIG. 4, which shows another embodiment of a calibration mechanism 400 according to the present invention. As will be described in more detail below, the calibration mechanism 400 is suitable for calibrating the level measurement device 100 when there are likely to be variations in both the apparent velocity $V_a$ and the offset or start delay time TS. In such instances, the calibration procedure requires additional information, i.e. known parameters. According to this aspect of the invention, the calibration mechanism 400 provides the capability to generate more than one reflection pulse 504, shown individually as 504a, 504b, 504c ... in FIG. 5. FIG. 5 shows an echo profile 500 with a calibration transmit pulse indicated by reference 502 and the multiple calibration reflection pulses or echoes 504.

Referring back to FIG. 4, the calibration mechanism 400 comprises a calibration or reference delay line indicated by reference 402. The calibration mechanism 400 includes an impedance component 410 to generate multiple reflections as will be described in more detail. As shown, one end 404 of the reference line 402 is connected to a terminal of the impedance component 410. The other terminal of the impedance component 410 is connected to the calibration terminal 136 of the calibration switch 130. The other end 406 of the reference line 402 is configured as an open circuit.

The impedance component 410 is selected to provide an impedance mismatch between the calibration or reference line 402 and the output of the radar transceiver 106 (i.e. the transmitter indicated by reference 109 in FIG. 4). When the impedance of the reference line 402 is different than the impedance (i.e. $Z_o$) of the transmitter 109, the calibration pulse (e.g. pulse 504a in FIG. 5) reflected by the end 406 of the reference line 402 is again reflected by the mismatched transition and another reflected pulse (e.g. pulse 504b in FIG. 5) is generated.

The impedance mismatch may be achieved in a number of ways. For example, the impedance component 410 may comprise a resistor $R_m$ connected in series between the output of the transmitter 109 (i.e. the calibration terminal 136) and the terminal end 404 of the reference delay line 402. The resistor $R_m$ is typically chosen to be 2 to 3 times higher than the impedance $Z_o$ which represents the impedance of the source, i.e. the transmitter 109 in the transceiver 106 (FIG. 1), and the reference delay line 402. The open circuit end 406 of the reference line 402 causes total reflection of the calibration transmit pulse 502 and the subsequent calibration reflection pulse(s) 504. The transceiver 106 (FIG. 1) typically includes a directional coupler so that a portion of the reflected pulse 504 is detected by the receiver in the transceiver 106, and the rest of the reflection pulse 504 is reflected or injected back into the reference delay line 402. It has been found that the calibration mechanism 400 configured as such is able to detect three or more reflections.

Referring still to FIG. 4, it will be appreciated that the impedance component 410 in the calibration mechanism 400 also serves to attenuate the signals (e.g. the calibrated transmit pulse 502 and re-directed calibration reflection pulses 504) transmitted into the reference delay line 402. For level measurement or time-of-flight ranging systems having a large dynamic range, the attenuation is acceptable, and may even be desirable to allow operation in the range where signals are normally expected from the ranging measurements. Because the calibration or reference delay line (i.e. the transmission line) can be designed in a controlled manner, attenuation losses can be made lower or higher as required. For example, for high frequency applications, a low cost coaxial cable may exhibit unacceptable loss levels, and a more expensive (lower loss) coaxial cable can be used or another type of waveguide or type of delay, for example, as described above.

Referring back to FIG. 5, the relative time-of-flights for the first, second and third reflected pulses 504a, 504b and 504c are represented by $TOF_{C1}$, $TOF_{C2}$, and $TOF_{C3}$, respectively. The total time-of-flight for a given calibration pulse interval is represented by $T_m$, and the start or delay time is represented by $TS_{CN}$. Once two or more of the reflected pulses 504 are detected, the time-base for the level measurement device 100 may be calculated as follows. First, locating the first and the second reflected pulses 504a and 504b allows the velocity $V_s$ to be determined using the following equation:

$$V_s = 2*L_c/TOF_{C2}$$

Using the distance between the first and the second reflected pulses 504a and 504b represented by time-of-flight values $TOF_{C2}$, the start or delay time $TS_{C2}$ is calculated using the following equation:

$$TS_{C2} = T_{t2} - TOF_{C2}$$

It will be appreciated that using this technique the start time TS can be determined even if the exact position of the transmit pulse (i.e. the calibration transmit pulse 502) is masked by crosstalk and/or internal reflections during the transmit period.

It will be further appreciated that the timebase can be calibrated at more than one point, for example, between $TOF_{c1}$ and $TOF_{c2}$ or between $TOF_{c2}$ and $TOF_{c3}$. The velocity $V_s$ can also be determined at any part of the measurement that has a corresponding reflected pulse 504, for example, in the echo profile 500 at reflected pulse 504a, 504b or 504c. If the velocity calculated is not the same for each segment of the measurement period, then a calibration may be done for each segment between the respective reflected pulses, as will be described in more detail with reference to FIGS. 6a and 6b.

Figure 6A:
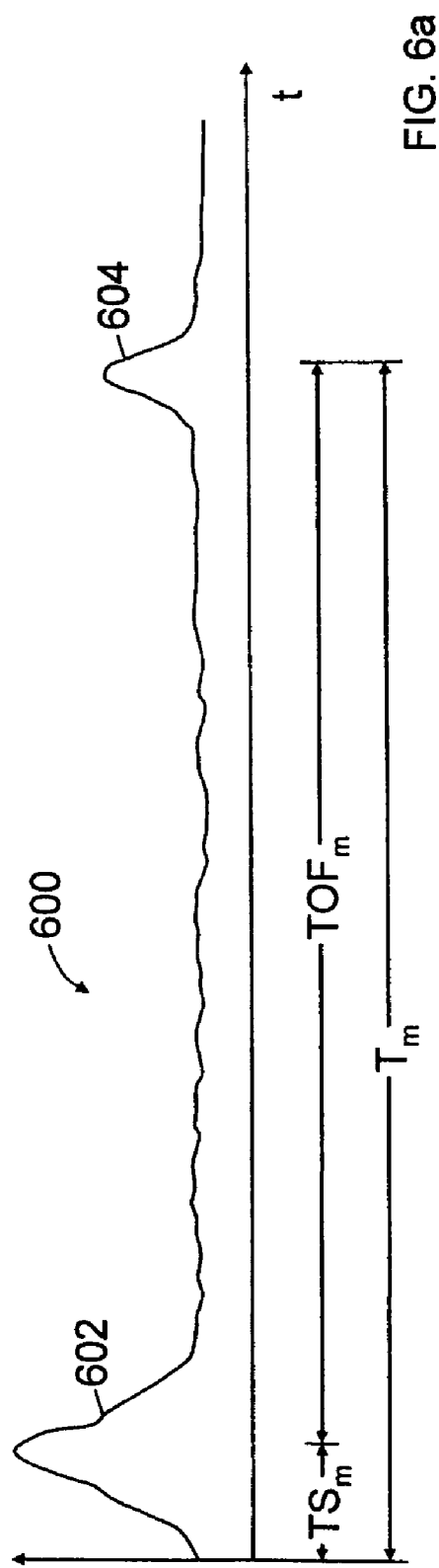
FIG. 6a shows in diagrammatic form a receive echo profile for the measurement transmit pulse or burst generated for the time-of-flight level measurement system.
Figure 6B:
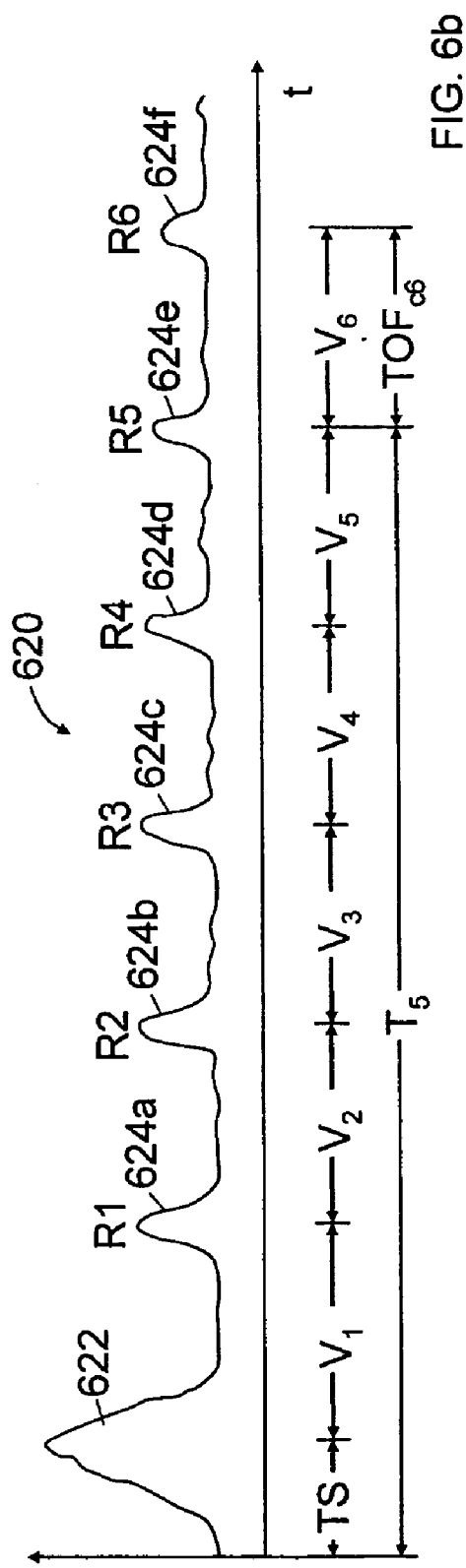
FIG. 6b shows in diagrammatic form a receive echo profile for the calibration transmit pulse and receive echo pulses generated by the embedded calibration module of FIG. 4.

Reference is first made to FIG. 6a, which shows an echo profile 600 for a measurement cycle or operation. The echo profile 600 comprises a measurement transmit pulse 602 and a reflected or echo pulse 604. The time-of-flight for the reflected pulse 604 is represented by $TOF_m$. The start or delay time for the measurement transmit pulse 602 is represented by $TS_m$ and the time for the measurement cycle is represented by $T_m$. Reference is next made to FIG. 6b, which shows an echo profile 620 for a corresponding calibration cycle comprising multiple reflections, for instance, generated using the calibration mechanism 400 as described above with reference to FIG. 4. The calibration echo profile 620 comprises a calibration transmit pulse 622 and a series of reflected or echo pulses 624, indicated individually by references 624a, 624b, 624c, 624d, 624e and 624f in FIG. 6b. The start or delay time for the calibration transmit pulse 622 is represented by TS. The time period between the calibration transmit pulse 622 and the fifth reflected pulse 624e (i.e. R5) is represented by $T_5$. The relative time-of-flight for the sixth reflected pulse 624f (i.e. R6) is represented by $TOF_{C6}$. Because the exact equivalent length of the calibration or reference delay line is known, i.e. parameter $L_c$, a multiple point calibration as depicted for the echo profile 620 of FIG. 6b can be performed. As depicted in FIG. 6b, the velocity values for each segment are represented by $V_1$, $V_2$, $V_3$, $V_4$, $V_5$ and $V_6$, respectively. Furthermore, because the equivalent length is known, it is not necessary to calculate the velocity for each segment. The measured distance is calculated as follows:

$$D_m = L_c * [5 + (T_m - T_5)/TOF_{c6}]$$

Using the above equation, the distance to the measured reflection is determined based on the length $L_c$ of the reference line and the calculated start time TS.

If the level measurement device 100 or calibration module 120 produces strong signals (i.e. transmit pulses) as required for generating multiple reflected pulses (i.e. pulses 504 in FIG. 5b), then there is the possibility of crosstalk during normal measurement cycles (i.e. the calibration switch 120 is connected to terminal 134). It is also possible for the transmitted signal to break through the calibration switch 130 because of parasitic coupling and the reflected pulse from the calibration module 120 can appear in the measurement.

Figure 7:
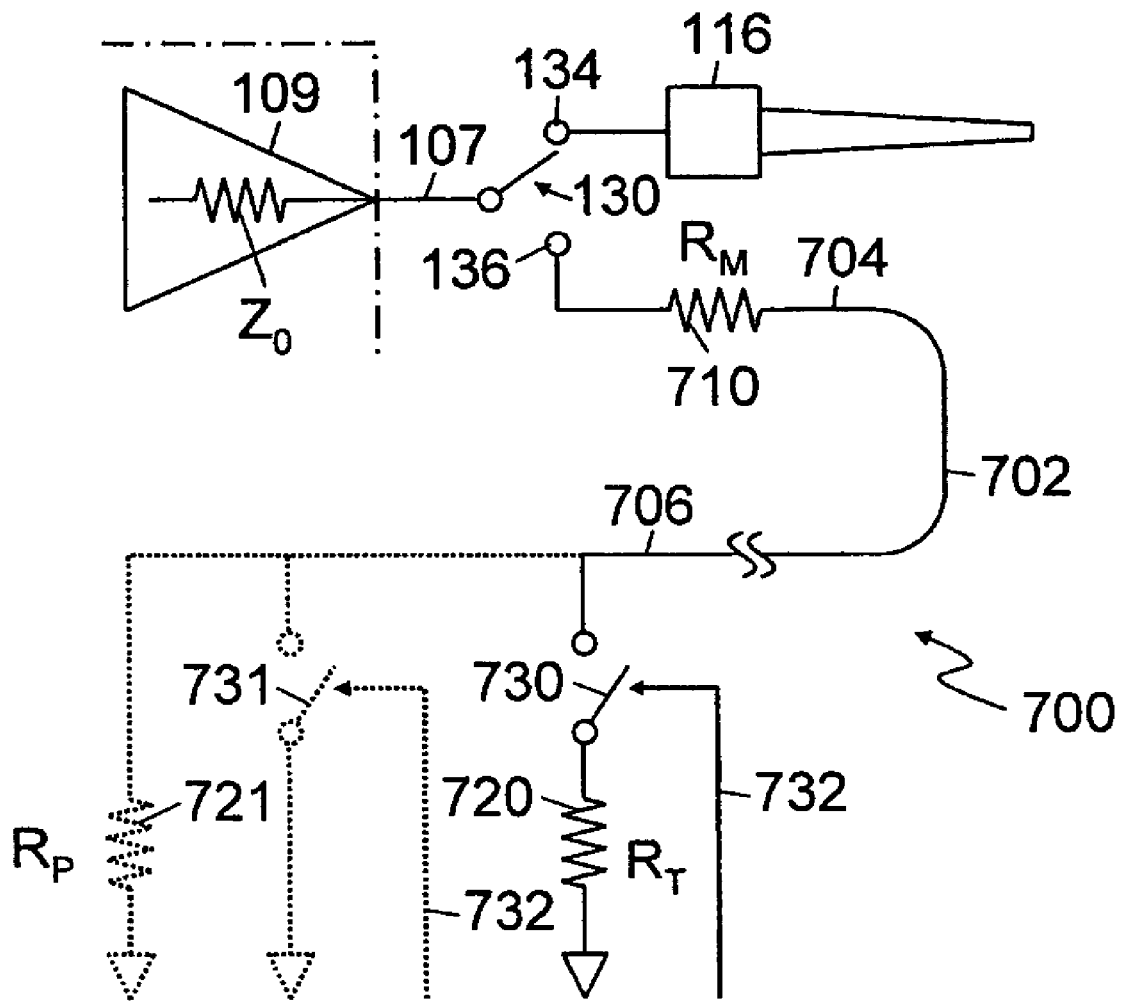
FIG. 7 shows in schematic form another embodiment of an embedded calibration mechanism according to the present invention.

Reference is next made to FIG. 7, which shows an embodiment of a calibration mechanism according to the present invention and indicated generally by reference 700. The calibration mechanism 700 is suitable for minimizing potential interference of calibration signals. The calibration mechanism 700 comprises a calibration or reference delay line indicated by reference 702, and an impedance component 710. As shown, one end 704 of the reference line 702 is connected to a terminal of the impedance component 710. The other terminal of the impedance component 710 is connected to the calibration terminal 136 of the calibration switch 130. The calibration mechanism 700 includes a second impedance component 720. One terminal of the second impedance component 720 is connected to signal ground and the other terminal of impedance component 720 is connected to one terminal of a termination switching device 730. The other terminal of the switching device 730 is connected to the other end 706 of the reference line 702. The termination switching device 730 has a control input 732 coupled to an output port on the microcontroller 102 (FIG. 1).

The termination switching device 730 and the second impedance device 720 provide a mechanism for terminating the reference delay line 702 with a matched impedance so that no reflection occurs or the reflected pulse is attenuated to the point that its effects are minimal. The impedance component 720 is selected to have an impedance $R_T$ which matches the impedance from the source when the calibration switch 130 is open. The switching device 730 may be implemented using an RE switch device, or a FET (Field Effect Transistor) component with the control input comprising the gate, for example.

In another embodiment, a termination switching device indicated by reference 731 is operated in a reverse mode, where the switch 731 is ON during calibration so that a short circuit or other desirable impedance is presented at the end 706 of the reference line 702. The impedance mis-match causes a good reflection. During a measurement cycle, the termination switch 731 is turned OFF, i.e. opened, and a parallel termination resistor 721 or $R_P$ absorbs any transmitted (e.g. parasitic) signals.

The calibration mechanism according to the present invention may be applied in two types of calibration and operational compensation techniques. The first type of calibration, i.e. Type 1 Calibration, and operational compensation, i.e. Type 1 Operational Compensation, involves determining a zero offset error (assuming that the apparent velocity is known). The second type of calibration, i.e. Type 2 Calibration, and operational compensation, i.e. Type 2 Operational Compensation, involves determining both the zero offset error and the apparent velocity. The processing steps for the calibration and compensation operations are described in more detail below by way of examples.

The zero offset error arises as a result of the time or delay it takes for the electronics (e.g. the microwave oscillators) to start up and/or changes in the characteristics of the electronics (e.g. the transistors) that generate the pulse or control signals that enable the microwave oscillators. The process for determining and removing the zero offset comprises a calibration stage and an operational compensation stage. According to this aspect, the calibration operation is performed once and the operational compensation is performed whenever a measurement is done.

The calibration operation, i.e. Type 1 Calibration, requires two targets at accurately known distances, represented by $D_1$ and $D_2$, and involves measuring four time intervals, represented by $T_1$, $T_2$, $T_r$, and $T_c$, respectively. The calibration operation comprises the following processing steps:

(1) the microprocessor (i.e. the microcontroller 102) accumulates an echo profile from target 1 at the known distance $D_1$, recognizes the reflection or echo pulse from the target, and determines the time from the start of the measurement cycle to the reflection, i.e $T_1$;

(2) the microprocessor measures the time $T_2$ to the second target at distance $D_2$ in a similar fashion as for (1);

(3) the microprocessor generates an internal reference pulse and determines a reference time $T_r$. The internal reference pulse may be generated using the calibration cable or channel 202 (FIG. 2) and the time-base generator 104 (FIG. 2), for example, in a closed loop configuration using a ramp, as described in US 20040201516, which is hereby incorporated by reference;

(4) the microprocessor switches the calibration switch 130 (FIG. 2) to the calibration cable 104 (FIG. 2) so that the calibration cable 204 becomes the measurement channel;

(5) the microprocessor measures the time $T_c$ to the end of the calibration cable in manner similar to that in (1) or (2) above.

With the time measurements $T_1$, $T_2$, $T_r$ and $T_c$ being performed, the microprocessor determines two calibration distances, a reference distance $D_r$ and a calibration distance $D_c$, which operation involves first calculating the apparent velocity $V_a$ as follows:

$$V_a = (D_2 - D_1) * 2 / (T_2 - T_1)$$

The reference distance $D_r$ is calculated as follows:

$$D_r = (T_r * V_a) / 2$$

and an offset time $T_{off}$ is determined as follows:

$$T_{off} = T_1 - (D_1 * 2) / V_a$$

and then the calibration cable length $D_c$ is calculated as follows:

$$D_c = (T_c - T_{off}) * V_a / 2$$

It is to be appreciated that the reference distance $D_r$ is related to the internal reference pulse generated by the time-base generator, for example, as described in US 20040201516. The reference distance $D_r$ is normally not prone to offset drift errors and does not require subsequent compensation.

The two calibration parameters $D_r$ and $D_c$ as determined above are written in non-volatile memory, for example EEPROM, and stored until such a time as the calibration is repeated.

The processing steps and operations described above are performed by the microprocessor (i.e. the microcontroller 102) which is suitably programmed to execute code comprising, for example, functions and routines. The program may comprise software or firmware, for example, stored in non-volatile memory.

Type 1 Operational Compensation involves using the two calibration distances $D_r$ and $D_c$, for example, during a level measurement operation. As will be described in more detail, during an operation such as level measurement, the microprocessor uses the calibration distances $D_r$ and $D_c$ stored in non-volatile memory to calculate the current apparent velocity $V_a$ and the zero offset time $T_{os}$. The unknown distance $D_m$ (i.e. the level measurement) to a surface can then be calculated from the time measured to the reflection $T_m$. The operational compensation comprises the following processing steps:

(1) the microprocessor (i.e. the microcontroller 102 in FIG. 1) executes code to accumulate a profile from the level being monitored at an as yet unknown distance $D_m$, recognize the reflection from the target (i.e the surface), and determine the time $T_m$ from the start of the measurement cycle to the reflection;

(2) the microprocessor executes code (for example, running in the background and simultaneously to the level measurement process in (1)) to determine a time $T_r$ for the internal reference pulse. The internal reference pulse may be generated as discussed above);

(3) the microprocessor executes code to switch the calibration switch 130 (FIG. 2) to couple the calibration cable 202 (FIG. 2) so that the calibration cable becomes the measurement channel;

(4) the microprocessor executes code to measure or determine the time to the end of the calibration cable, i.e. $T_c$, in a manner similar to that discussed above for calibration.

To reduce the effects of noise and/or high frequency "jitter", for example, as a result of vibration, surface movement or electrical noise, the microprocessor may average a number of echo profiles to generate any or all of the measurements discussed above.

The microprocessor includes code to calculate or determine the distance $D_m$ to the surface of material. The microprocessor first determines a current value for the apparent velocity $V_a$ as follows:

$$V_a = (D_r * 2) / T_r$$

where the reference distance $D_r$ is retrieved from non-volatile memory, and the reference time $T_r$ was determined as described above in (2).

The microprocessor calculates the zero offset error time $T_{os}$ as follows:

$$T_{os} = T_c - (D_c * 2) / V_a$$

The microprocessor then calculates the distance measurement $D_m$, i.e. the distance to the surface of the material held in the vessel, as follows:

$$D_m = (T_m - T_{os}) / (2 * V_a)$$

For the second type, i.e. Type 2 calibration and Type 2 operational compensation, both the apparent velocity and the zero offset error are determined as will be described in more detail below. It is to be appreciated that the velocity is fully compensated because all measurements of calibration and reference distances are performed on the transmitted signal.

As will be described in more detail below, for Type 2 operation four time intervals are measured, $T_1$, $T_2$, $T_{c1}$ and $T_{c2}$. Time intervals $T_1$ and $T_2$ correspond to two targets at accurately known distances $D_1$ and $D_2$, respectively. The first time interval $T_{c1}$ corresponds to the time interval for a first reflection from the end of the internal calibration cable 202 (FIG. 2). The second time interval $T_{c2}$ corresponds to the time interval for a second reflection from the end of the internal calibration cable caused by an impedance mismatch, for example, at the calibration switch/calibration cable interface as described above. (This measurement replaces the time interval measurement $T_r$ described above for an internal reference pulse.)

The calibration operation comprises the following processing or method steps:

(1) the microprocessor accumulates a profile from target 1 at a distance $D_1$, the reflection from the first target is determined and the time from the start of the measurement cycle to the reflection $T_1$ is determined;

(2) the microprocessor determines the time $T_2$ to the second target at known distance $D_2$ in a manner similar to (1) above;

(3) the microprocessor switches or actuates the calibration switch 130 (FIG. 2) to couple the internal calibration cable 202 so that the cable 202 becomes the measurement channel;

(4) the microprocessor measures the time $T_{c1}$ to the end of the calibration cable 202 in a similar fashion as for (1) or (2), i.e. generating an echo profile and identifying the reflection to determine the time interval;

(5) the microprocessor measures the time $T_{c2}$ for the second reflection from the calibration cable 202 in a manner as for (4) above.

With the time measurements $T_1$, $T_2$, $T_{c1}$ and $T_{c2}$ being performed, the microprocessor determines two calibration distances, a reference distance $D_r$ and a calibration distance $D_c$, which involves first calculating the apparent velocity $V_a$ as follows:

$$V_a = (D_2 - D_1) * 2 / (T_2 - T_1)$$

The reference distance $D_r$ is calculated as follows:

$$D_r = (T_{c2} - T_{c1}) * V_a / 2$$

and an offset time $T_{off}$ is determined as follows:

$$T_{off} = T_1 - (D_1 * 2) / V_a$$

and then the calibration cable length $D_c$ is calculated as follows:

$$D_c = (T_{c1} - T_{off}) * V_a / 2$$

It is to be appreciated that the reference distance $D_r$ is related to the length of calibration cable. Although described separately, the time measurements $T_{c1}$ and $T_{c2}$ may be determined from the same echo profile.

The two calibration parameters (i.e. constants) $D_r$ and $D_c$ are written to non-volatile memory and stored until the calibration operation is repeated or updated.

Type 2 Operational Compensation involves using the two calibration distances $D_r$ and $D_c$, for example, during a level measurement operation. As will be described in more detail, during an operation such as level measurement, the microprocessor uses the calibration distances $D_r$ and $D_c$ stored in non-volatile memory to calculate the apparent velocity $V_a$ and the zero offset error time $T_{os}$. The unknown distance to the surface $D_m$ is then calculated from the time measured to the reflection $T_m$ as follows:

(1) the microprocessor (i.e. under stored program control) accumulates/generates an echo profile from the level being monitored at an as yet unknown distance $D_m$, the microprocessor determines the reflection from the target surface, and the time from the start of the measurement cycle to the reflected pulse $T_m$ is calculated;

(2) the microprocessor actuates the calibration switch 130 (FIG. 2) so that the calibration cable 202 (FIG. 2) becomes the measurement channel;

(3) the microprocessor measures the time to the end of the calibration cable $T_{c1}$ in a similar manner for a level measurement operation;

(4) the microprocessor measures the time to the end of the calibration cable $T_{c2}$ in the same manner as for $T_{c1}$ in (3) above.

Although described as separate calculations, the time measurements $T_{c1}$ and $T_{c2}$ may be determined from the same echo profile, which can effectively reduce the time required for profile acquisition and averaging if more than one echo profile is accumulated and averaged. As described above, several echo profiles may be accumulated and averaged to reduce noise and high frequency jitter.

The microprocessor calculates the distance $D_m$ to the surface by first determining the current apparent velocity $V_a$ and the zero offset error time $T_{os}$ as follows:

$$V_a = (D_r * 2) / (T_{c2} - T_{c1}), \text{ and}$$

$$T_{os} = T_{c1} - (D_c * 2) / V_a$$

The distance to the surface $D_m$ is then determined by the microprocessor (under stored program controlled) as follows:

$$D_m = (T_m - T_{os}) / (2 * V_a)$$

While the calibration mechanism according to the present invention has been described in the context of a pulse radar based level measurement or time-of-flight system, it will be appreciated that the calibration mechanism is equally suitable for a TDR based system, for example, with the modifications or considerations as described above.

What is claimed is:

1. A time-of-flight ranging system comprising:
   an antenna for emitting an energy pulse and coupling a reflected energy pulse;
   a switch having a first terminal, a second terminal, a third terminal, and a control terminal, said control terminal adapted for receiving a control signal for switching said first terminal between said second terminal and said third terminal, and said second terminal being coupled to said antenna for selecting said antenna in response to said control signal;
   a controller having an output coupled to the control terminal of said switch, and a component for generating the control signal for controlling said switch;
   a transceiver operatively coupled to said controller having a bidirectional port coupled to the first terminal of said switch, said transceiver having an input port for receiving a pulse train and generating a transmit pulse for exciting said antenna for emitting said energy pulse, and said transceiver having an output port for outputting a reflected energy pulse received from said antenna; and
   a calibration module having a calibration bidirectional port coupled to the third terminal of said switch, said calibration bidirectional port being selectively coupled to the bidirectional port of said transceiver through said switch in response to said control signal, and when selectively coupled said calibration module receiving a calibration transmit pulse from said transceiver, and said calibration module including a calibration component for generating an echo pulse in response to said calibration transmit pulse;
   wherein said calibration transmit pulse is separated in time from said echo pulse by a calibration time of flight corresponding to an equivalent length of travel of the transmit pulse in air.

2. The time-of-flight ranging system as claimed in claim 1, wherein said calibration component comprises a reference line having one or more known parameters, said controller having a component for calibrating said transmit pulse and said reflected energy pulse based on said known parameters.

3. The time-of-flight ranging system as claimed in claim 2, wherein said one or more known parameters comprise a start time for said calibration transmit pulse and said component for calibrating said transmit pulse comprises code for calculating an apparent velocity according to an equation as follows:

$$V_a = 2 * L / (TOF_c),$$

wherein, parameter L represents the equivalent transmission length of travel for said calibration component, and parameter $TOF_c$ represents a time of flight measurement for a calibration echo pulse.

4. The time-of-flight ranging system as claimed in claim 3, wherein a target distance $D_m$ is determined according to an equation as follows:

$$D_m = TOF_m / (2 * V_a),$$

wherein, parameter $TOF_m$ represents a time-of-flight measurement for said reflected energy pulse.

5. The time-of-flight ranging system as claimed in claim 4, wherein said time-of-flight measurement $TOF_m$ is determined according to an equation as follows:

$$TOF_m = T_m - T_s,$$

wherein, parameter $T_m$ represents a total measurement time, and parameter $T_s$ represents a start time for said transmit pulse.

6. The time-of-flight ranging system as claimed in claim 5, wherein said a start time $T_s$ for said transmit pulse is determined according to an equation as follows:

$$T_s = T_t \cdot 2 \cdot L/V_a,$$

wherein, parameter $T_t$ represents a total time of flight for said echo pulse, and parameter L represents an equivalent transmission length for said calibration component.

7. The time-of-flight ranging system as claimed in claim 1, wherein said calibration component comprises a coaxial cable having a known length, and one end of said coaxial cable coupled to the third terminal of said switch, and the other end of said coaxial cable coupled to a reflection mechanism.

8. The time-of-flight ranging system as claimed in claim 7, wherein said reflection mechanism comprises an open circuit.

9. The time-of-flight ranging system as claimed in claim 7, wherein said reflection mechanism comprises a short circuit.

10. The time-of-flight ranging system as claimed in claim 1, wherein said calibration component comprises a component selected from the group consisting of a waveguide section, a coaxial cable, a thin film delay line, a microwave acoustic delay line, a lumped distributed delay line, a MSW line and a meander line.

11. The time-of-flight ranging system as claimed in claim 10, wherein said calibration module includes an impedance component coupled between said switch and said calibration component, and said impedance component providing an impedance mismatch to generate more than one of said echo pulses.

12. The time-of-flight ranging system as claimed in claim 7, wherein said reflection mechanism comprises a switchable impedance component including a second impedance component and a switching device having a switch control input responsive to a switch control signal from said controller, said switching device having one terminal coupled to an end of said calibration component and another terminal coupled to said second impedance component, and in response to said switch control signal said second impedance component being selectively connected and disconnected from said calibration component, and when selectively connected said impedance component minimizing reflection of any pulses coupled by said calibration component.

13. A method for calibrating a time-of-flight ranging system, the time-of-flight ranging system including an antenna for emitting a transmit pulse and detecting an echo pulse, a transceiver having a bidirectional port operatively coupled to the antenna through a switching device, a calibration channel having a bidirectional port operatively coupled to the bidirectional port of the transceiver, a controller having a control output for controlling the switching device to selectively couple the transceiver to the antenna or to the calibration channel, said method comprising the steps of:
actuating the switching device to couple the bidirectional port of the transceiver to the calibration channel;
generating a calibration transmit pulse and transmitting said calibration transmit pulse to the calibration channel;
receiving a calibration echo pulse from said calibration channel, said calibration echo pulse being associated with said calibration transmit pulse; and
determining one or more calibration parameters based on said calibration transmit pulse or said calibration echo pulse;
wherein said calibration transmit pulse is separated in time from said calibration echo pulse by a calibration time of flight corresponding to an equivalent transmission length of travel of the transmit pulse in air.

14. The method as claimed in claim 13, wherein said step of determining one or more calibration parameters comprises calculating an apparent velocity to an equation as follows:

$$V_a = 2 \cdot L/(TOF_c),$$

wherein, parameter L represents the equivalent transmission length of travel for said calibration channel, and parameter $TOF_c$ represents a calibration time of flight measurement for said calibration echo pulse.

15. The method as claimed in claim 14, wherein said step of determining one or more calibration parameters comprises calculating a start time $T_s$ for the transmit pulse is determined according to an equation as follows:

$$T_s = 2 \cdot L/V_a,$$

wherein, parameter T represents a total time of flight for the echo pulse, and parameter L represents the equivalent transmission length of travel for said calibration channel.

16. The method as claimed in claim 14, further including the step of calculating a target distance $D_m$ according to an equation as follows:

$$D_m = TOF_m/(2 \cdot V_a),$$

wherein, parameter $TOF_m$ represents a time-of-flight measurement for the echo pulse.

17. The method as claimed in claim 16, wherein said time-of-flight measurement $TOF_m$ is determined according to an equation as follows:

$$TOF_m = T_m - T_s,$$

wherein, parameter $T_m$ represents a total measurement time, and parameter $T_s$ represents a start time for the transmit pulse.

18. The method as claimed in claim 17, wherein said start time $T_s$ for the transmit pulse is determined according to an equation as follows:

$$T_s = T - 2 \cdot L/V_a,$$

wherein, parameter T represents a total time of flight for the echo pulse, and parameter L represents the equivalent transmission length of travel for the calibration channel.

19. The method as claimed in claim 13, further including the step of generating a plurality of calibration echo pulses, and said step of determining one or more calibration parameters is based on said plurality of calibration echo pulses.

20. The method as claimed in claim 19, wherein each pair of said calibration echo pulses provides a calibration segment, and said one or more calibration parameters are associated with one of said calibration segments.

21. The method as claimed in claim 20, wherein said one or more calibration parameters comprise an apparent velocity $V_a$ for the calibration echo pulse in said calibration channel.

22. The method as claimed in claim 21, wherein said apparent velocity $V_a$ is calculated according to an equation as follows:

$$V_a = 2*L/(TOF_{c2}),$$

wherein, parameter L represents the equivalent transmission length of travel for said calibration channel, and parameter $TOF_{c2}$ represents a time of flight measurement between two of said calibration echo pulses or one of said calibration segments.

23. The method as claimed in claim 20, wherein said one or more calibration parameters comprise a start delay $T_s$ for the transmit pulse, and said start delay $T_s$ is calculated according to an equation as follows:

$$T_s = T_t - TOF_{c1},$$

wherein, parameter $T_t$ represents a total time for a measurement cycle, and parameter $TOF_{c1}$ represents a time of flight measurement between said calibration transmit pulse and said echo pulse.

* * * * *